(No Model.)

J. E. WARREN
FILTER.

No. 404,236. Patented May 28, 1889.

Witnesses.
Fred. L. Greenleaf
Frederick L. Emery.

Inventor.
John E. Warren
by Crosby & Gregory
Attys.

UNITED STATES PATENT OFFICE.

JOHN E. WARREN, OF CUMBERLAND MILLS, ASSIGNOR TO THE CUMBERLAND MANUFACTURING COMPANY, OF PORTLAND, MAINE.

FILTER.

SPECIFICATION forming part of Letters Patent No. 404,236, dated May 28, 1889.

Application filed October 3, 1888. Serial No. 287,068. (No model.)

*To all whom it may concern:*

Be it known that I, JOHN E. WARREN, of Cumberland Mills, county of Cumberland, State of Maine, have invented an Improvement in Filters, of which the following description, in connection with the accompanying drawings, is a specification, like letters on the drawings representing like parts.

This invention relates to filters, and is an improvement upon the filter shown and described in another application, Serial No. 257,296, filed by me December 8, 1887; and my invention has for its object to improve the construction of the said filter, so that the foreign or sedimentary matter held in suspension by the fluid—usually water—may be more effectually removed therefrom and from the filter.

The particular features in which my invention consists will be pointed out in the claims at the end of this specification.

Figure 1:
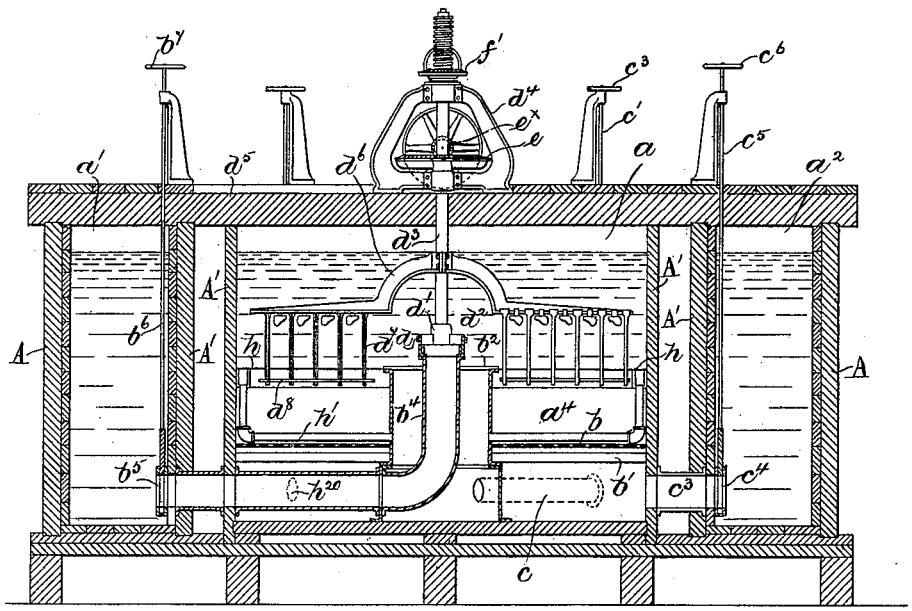
Figure 2:
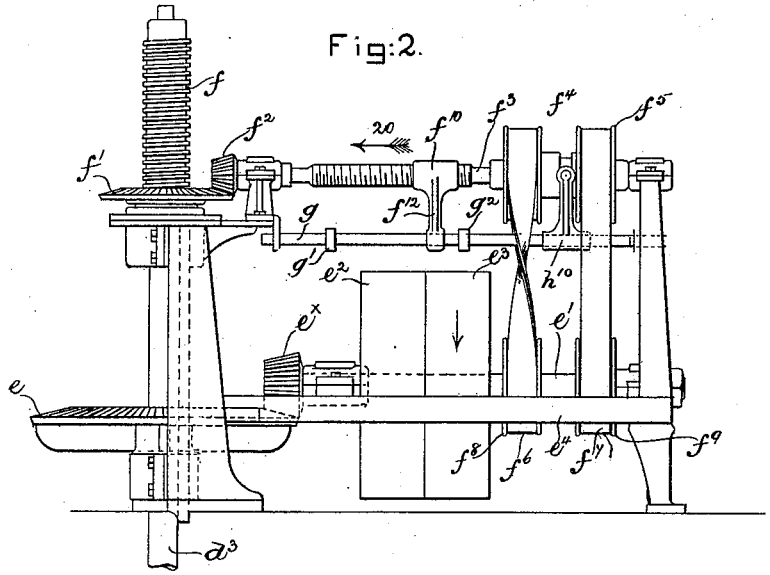

Figure 1 is a vertical section of a filter embodying my invention, and Fig. 2 a detail in elevation to show the driving mechanism.

The tank or vessel A, which may be of any desired capacity, is divided, as herein shown, by upright walls A', into a central chamber, $a$, and an annular space divided into chambers $a'$ $a^2$ by substantially diametrically-opposite walls. (Not shown.) The chamber $a$ contains within it the filtering-bed $a^4$, of sand or other granular or usual material, which is supported, as shown, upon a perforated metal plate, $b$, resting upon suitable slats or beams $b'$. The chamber $a$ also contains within it a hollow pipe or casting forming a well, $b^2$, for the reception of water and sedimentary matter, the said pipe or casting being sustained, as shown, by the bottom of the cistern and extended up through the filter-bed, its upper rim or edge being substantially level with the top or upper surface of the filter-bed.

The well $b^2$ has extended through it a pipe, $b^4$, constituting the inlet-pipe for the filter, the said pipe communicating with the chamber $a'$ of the filter and having its inlet-mouth controlled by a gate or valve, $b^5$, herein shown as operated through a valve-rod, $b^6$, and wheel $b^7$ from above the filter, the chamber $a'$, as shown, constituting the inlet-chamber for the filter. The well $b^2$ is provided with a suitable discharge-pipe, $c$, (see dotted lines, Fig. 1,) by which the water and sediment in the said well may be discharged therefrom, the said pipe being controlled by a suitable valve, (not shown,) but which may be operated through the rod $c'$ and wheel $c^2$.

The chamber $a$, below the filter-bed, is provided with a suitable outlet-pipe, $c^3$, herein shown as discharging the filtered water from the said chamber into the chamber $a^2$, which constitutes the outlet-chamber for the filter, the discharge of filtered water from the chamber $a$ into the chamber $a^2$ being controlled by a gate or valve, $c^4$, operated through the rod $c^5$ and wheel $c^6$, the water in the chamber $a^2$ passing therefrom through a suitable outlet. (Not shown.)

The inlet-pipe $b^4$, as shown, is extended above the well, and has secured to it, as by set-screws $d$, a casting composed essentially of a hub, $d'$, and radial arms $d^2$, between which arms the water is discharged from the inlet-pipe into the chamber $a$. The hub $d'$ forms a guide for a vertically-movable shaft, $d^3$, extended above the filter, and supported in suitable bearings in a bracket or standard, $d^4$, sustained, as shown, by the cross-beam $d^5$. The shaft $d^3$ has firmly secured to it an agitator composed, as herein shown, of the arms $d^6$, provided with fingers $d^7$, preferably connected together at their lower ends or points by a sweep or blade, $d^8$, secured to the said fingers so as to incline toward the filter-bed. The shaft $d^3$ has splined upon it a bevel gear-wheel, $e$, through which rotation is imparted to the agitator to stir up or agitate the filter-bed when the fingers $d^7$ are inserted therein, as will be described. The bevel-gear $e$ is rotated by a bevel-pinion, $e^\times$, on a shaft, $e'$, provided with fast and loose pulleys $e^2$ $e^3$, the said shaft being supported in suitable bearings in a frame, $e^4$, sustained by the tank or vessel. The upper end of the shaft $d^3$ is provided with screw-threads $f$, to engage threads on the inner side of the hub of a bevel-gear, $f'$, rotated by a pinion, $f^2$, on a shaft, $f^3$, provided, as shown, with clutch-pulleys $f^4$ $f^5$, connected by belts $f^6$ $f^7$ to pulleys $f^8$ $f^9$ on the shaft $e'$.

The shaft $f^3$ is made screw-threaded for a portion of its length, as shown, and has mounted upon it a threaded sleeve or hub, $f^{10}$, having an arm, $f^{12}$, through which is extended a rod, $g$, provided on opposite sides of the arm with collars or tappets $g'$ $g^2$, the said rod having secured to it the clutch $h^{10}$, of any usual or well-known construction, the mechanism just described constituting an automatic stop mechanism, by which the direction of travel of the movable shaft may be controlled.

In the operation of my improved filter the water or other fluid to be filtered is discharged into the chamber $a$ through the inlet-pipe $b^4$, the said water filling the well $b^2$ and the chamber above the filter-bed, as indicated by broken lines, the discharge-pipe $c$ for the well being closed. The water passes through the filter-bed and into the outlet-chamber $a^2$, the valve $c^4$ being open. In practice it has been ascertained that the lighter impure particles gravitate toward the center of the filter-bed, and with my improved filter these lighter impure particles precipitate to the bottom of the well, while the heavier impure particles, which gravitate toward the walls of the chamber $a$, are collected by a peripheral gutter, $h$, from whence they are conducted to the central well by pipes $h'$.

The central well and peripheral gutter are especially advantageous when it is desired to wash the filter-bed, as they afford a rapid egress for the contaminated or impure water. During the process of filtration the agitator may be revolved with the points of the fingers near but not in contact with the filter-bed. As the agitator is thus revolved, the sweeps or blades tend to suck up and keep afloat the sediment and prevent it settling down upon the filter-bed. So, also, when the sweep or blade is in the filter-bed and the agitator revolved during the washing of the filter-bed, the said sweep or blade cuts the filter-bed horizontally and lifts it up, thereby more effectually freeing it from the adhering sediment.

If desired, I may secure two or more sweeps or blades to the fingers on each arm.

The downward travel or movement of the shaft is limited by the tappet-arm striking one tappet, as $g'$, thereby disengaging the clutch $h^{10}$, of ordinary construction, from one pulley, as $f^5$, and engaging it with the pulley $f^4$, thereby reversing the direction of movement of the shaft $f^3$ and causing it to ascend, its upward movement being limited by the tappet-arm striking the tappet $g^2$. As shown in the drawings, the sleeve $f^{10}$ is traveling in the direction of arrow 20, Fig. 2, the shaft $d^3$ being supposed to be on its downward movement, it being moved upward by the clutch engaging the pulley $f^4$, the said clutch being brought into engagement with the said pulley by the tappet-arm $f^{12}$ striking the tappet $g'$. When the gate or valve $c^4$ is closed, the water may be discharged from the chamber $a$ through an outlet, $h^{20}$, controlled by a suitable valve. (Not shown.)

I claim—

1. In a filter, a tank or vessel and a filter-bed contained therein, combined with a well extended up through and below the filter-bed and closed at its bottom to receive sediment, and provided with a discharge-outlet through which the sediment in the said well is removed therefrom, and with an inlet-pipe extended into said well, substantially as and for the purpose set forth.

2. In a filter, a tank or vessel and a filter-bed contained therein, combined with a well extended through the filter-bed, and with a peripheral gutter, $h$, connected to said well, substantially as and for the purpose specified.

3. In a filter, the combination, with a tank or vessel and a filter-bed therein, of a vertically-moving shaft, $d^3$, an agitator secured to said shaft and consisting of an arm having fingers, and a sweep or blade secured to said fingers, and automatic stop mechanism consisting of the threaded shaft $f^3$, sleeve $f^{10}$, having an arm, $f^2$, rod $g$, extended through said arm and provided with collars on opposite sides of said arm, and a clutch connected to said rod and operated through the said arm and collars to produce opposite travel of the shaft $d^3$, substantially as described.

4. In a filter, the combination, with a tank or vessel and a filter-bed therein, of a well, $d^2$, an inlet-pipe extended through said well, a vertically-movable shaft, an agitator secured thereto, and mechanism, substantially as described, to automatically stop or limit the movement of the said shaft in opposite directions, substantially as described.

In testimony whereof I have signed my name to this specification in the presence of two subscribing witnesses.

JOHN E. WARREN.

Witnesses:
WILLIS R. TENNEY,
M. W. ARMSTRONG.